US009373340B2

(12) United States Patent
Hetherington et al.

(10) Patent No.: US 9,373,340 B2
(45) Date of Patent: Jun. 21, 2016

(54) METHOD AND APPARATUS FOR SUPPRESSING WIND NOISE

(75) Inventors: Phil Hetherington, Vancouver (CA); Xueman Li, Burnaby (CA); Pierre Zakarauskas, Vancouver (CA)

(73) Assignee: 2236008 Ontario, Inc., Waterloo, Ontario (CA)

( * ) Notice: Subject to any disclaimer, the term of this patent is extended or adjusted under 35 U.S.C. 154(b) by 546 days.

(21) Appl. No.: 13/013,358

(22) Filed: Jan. 25, 2011

(65) Prior Publication Data

US 2011/0123044 A1 May 26, 2011

Related U.S. Application Data

(63) Continuation of application No. 10/410,736, filed on Apr. 10, 2003, now Pat. No. 7,885,420.

(60) Provisional application No. 60/449,511, filed on Feb. 21, 2003.

(51) Int. Cl.
*G10L 21/02* (2013.01)
*H04B 15/00* (2006.01)
(Continued)

(52) U.S. Cl.
CPC ......... *G10L 21/0208* (2013.01); *G10L 21/0232* (2013.01); *G10L 2021/02163* (2013.01); *H04R 2410/07* (2013.01)

(58) Field of Classification Search
CPC . G10L 21/02; G10L 21/0208; G10L 21/0232; G10L 2021/02163; G10L 2021/02166; H04R 2410/00; H04R 2410/07; H04R 3/00; H04R 2499/13
USPC ................. 381/83, 93, 94.2, 71.1, 71.4, 71.5, 381/94.1–94.9, 317; 700/94; 704/233, 226, 704/E21.002, E21.004
See application file for complete search history.

(56) References Cited

U.S. PATENT DOCUMENTS 4,486,900 A 12/1984 Cox et al.
4,531,228 A 7/1985 Noso et al.

(Continued)

FOREIGN PATENT DOCUMENTS

CA 2158847 9/1994
CA 2157496 10/1994

(Continued)

OTHER PUBLICATIONS

Boll, Steven. "Suppression of acoustic noise in speech using spectral subtraction." Acoustics, Speech and Signal Processing, IEEE Transactions on 27, No. 2 (1979): 113-120.*

(Continued)

*Primary Examiner* — Paul McCord
*Assistant Examiner* — Alexander Eljaiek
(74) *Attorney, Agent, or Firm* — Brinks, Gilson & Lione

(57) ABSTRACT

The invention includes a method, apparatus, and computer program to selectively suppress wind noise while preserving narrow-band signals in acoustic data. Sound from one or several microphones is digitized into binary data. A time-frequency transform is applied to the data to produce a series of spectra. The spectra are analyzed to detect the presence of wind noise and narrow band signals. Wind noise is selectively suppressed while preserving the narrow band signals. The narrow band signal is interpolated through the times and frequencies when it is masked by the wind noise. A time series is then synthesized from the signal spectral estimate that can be listened to. This invention overcomes prior art limitations that require more than one microphone and an independent measurement of wind speed. Its application results in good-quality speech from data severely degraded by wind noise.

20 Claims, 9 Drawing Sheets

(51) Int. Cl.

| | |
|---|---|
| ***G10L 21/0208*** | (2013.01) |
| *G10L 21/0216* | (2013.01) |
| *G10L 21/0232* | (2013.01) |

(56) References Cited

U.S. PATENT DOCUMENTS 4,630,304 A 12/1986 Borth et al.
4,630,305 A 12/1986 Borth et al.
4,811,404 A 3/1989 Vilmur et al.
4,843,562 A 6/1989 Kenyon et al.
4,845,466 A 7/1989 Hariton et al.
4,959,865 A 9/1990 Stettiner et al.
5,012,519 A 4/1991 Adlersberg et al.
5,027,410 A 6/1991 Williamson et al.
5,056,150 A 10/1991 Yu et al.
5,140,541 A 8/1992 Sakata et al.
5,146,539 A 9/1992 Doddington et al.
5,251,263 A 10/1993 Andrea et al.
5,313,555 A 5/1994 Kamiya
5,400,409 A 3/1995 Linhard
5,412,589 A 5/1995 Williams et al.
5,426,703 A 6/1995 Hamabe et al.
5,426,704 A 6/1995 Tamamura et al.
5,442,712 A * 8/1995 Kawamura et al. ............. 381/83
5,479,517 A 12/1995 Linhard
5,485,522 A 1/1996 Solve et al.
5,495,415 A 2/1996 Ribbens et al.
5,499,189 A 3/1996 Seitz
5,502,688 A 3/1996 Recchione et al.
5,526,466 A 6/1996 Takizawa
5,550,924 A 8/1996 Helf et al.
5,568,559 A 10/1996 Makino
5,574,824 A 11/1996 Slyh et al.
5,584,295 A 12/1996 Muller et al.
5,586,028 A 12/1996 Sekine et al.
5,617,508 A 4/1997 Reaves
5,651,071 A 7/1997 Lindemann et al.
5,677,987 A 10/1997 Seki et al.
5,680,508 A 10/1997 Liu
5,692,104 A 11/1997 Chow et al.
5,701,344 A 12/1997 Wakui
5,708,754 A 1/1998 Wynn
5,727,072 A 3/1998 Raman
5,752,226 A 5/1998 Chan et al.
5,757,937 A 5/1998 Itoh et al.
5,809,152 A 9/1998 Nakamura et al.
5,839,101 A 11/1998 Vahatalo et al.
5,859,420 A 1/1999 Borza
5,878,389 A 3/1999 Hermansky et al.
5,920,834 A 7/1999 Sih et al.
5,933,495 A 8/1999 Oh
5,933,801 A 8/1999 Fink et al.
5,949,888 A 9/1999 Gupta et al.
5,950,154 A 9/1999 Medaugh et al.
5,963,901 A * 10/1999 Vahatalo et al. .............. 704/233
5,982,901 A 11/1999 Kane et al.
6,011,853 A 1/2000 Koski et al.
6,108,610 A 8/2000 Winn
6,122,384 A 9/2000 Mauro
6,122,610 A 9/2000 Isabelle
6,130,949 A * 10/2000 Aoki et al. ................... 381/94.3
6,163,608 A 12/2000 Romesburg et al.
6,167,375 A 12/2000 Miseki et al.
6,173,074 B1 1/2001 Russo
6,175,602 B1 1/2001 Gustafsson et al.
6,192,134 B1 2/2001 White et al.
6,199,035 B1 3/2001 Lakaniemi et al.
6,208,268 B1 3/2001 Scarzello et al.
6,230,123 B1 5/2001 Mekuria et al.
6,252,969 B1 * 6/2001 Ando ............................ 381/103
6,289,309 B1 9/2001 deVries
6,405,168 B1 6/2002 Bayya et al.
6,415,253 B1 7/2002 Johnson
6,434,246 B1 8/2002 Kates et al.
6,449,594 B1 9/2002 Hwang et al.
6,453,285 B1 9/2002 Anderson et al.
6,507,814 B1 1/2003 Gao
6,510,408 B1 1/2003 Hermansen
6,587,816 B1 7/2003 Chazan et al.
6,615,170 B1 9/2003 Liu et al.
6,643,619 B1 11/2003 Linhard et al.
6,647,365 B1 11/2003 Faller
6,687,669 B1 2/2004 Schrögmeier et al.
6,711,536 B2 3/2004 Rees
6,741,873 B1 5/2004 Doran et al.
6,766,292 B1 7/2004 Chandran et al.
6,768,979 B1 7/2004 Menéndez-Pidal et al.
6,782,363 B2 8/2004 Lee et al.
6,822,507 B2 11/2004 Buchele
6,859,420 B1 2/2005 Coney et al.
6,882,736 B2 4/2005 Dickel et al.
6,910,011 B1 6/2005 Zakarauskas
6,937,980 B2 8/2005 Krasny et al.
6,959,276 B2 10/2005 Droppo et al.
7,043,030 B1 5/2006 Furuta
7,047,047 B2 5/2006 Acero et al.
7,062,049 B1 6/2006 Inoue et al.
7,072,831 B1 7/2006 Etter
7,092,877 B2 8/2006 Ribic
7,117,145 B1 10/2006 Venkatesh et al.
7,117,149 B1 10/2006 Zakarauskas
7,139,701 B2 11/2006 Harton et al.
7,158,932 B1 1/2007 Furuta
7,165,027 B2 1/2007 Kellner et al.
7,313,518 B2 12/2007 Scalart et al.
7,373,296 B2 5/2008 Van De Par et al.
7,386,217 B2 6/2008 Zhang
7,885,420 B2 * 2/2011 Hetherington et al. ...... 381/94.2
2001/0028713 A1 10/2001 Walker
2002/0037088 A1 3/2002 Dickel et al.
2002/0071573 A1 6/2002 Finn
2002/0094100 A1 7/2002 Kates
2002/0094101 A1 7/2002 De Roo et al.
2002/0152066 A1 10/2002 Piket
2002/0176589 A1 11/2002 Buck et al.
2002/0193130 A1 12/2002 Yang et al.
2003/0040908 A1 2/2003 Yang et al.
2003/0112265 A1 * 6/2003 Zhang ........................... 345/723
2003/0115055 A1 6/2003 Gong
2003/0147538 A1 * 8/2003 Elko ............................... 381/92
2003/0151454 A1 8/2003 Buchele
2003/0216907 A1 11/2003 Thomas
2004/0019417 A1 1/2004 Yasui et al.
2004/0078200 A1 4/2004 Alves
2004/0093181 A1 5/2004 Lee
2004/0138882 A1 7/2004 Miyazawa
2004/0161120 A1 8/2004 Petersen et al.
2004/0165736 A1 8/2004 Hetherington et al.
2004/0167777 A1 8/2004 Hetherington et al.
2005/0114128 A1 5/2005 Hetherington et al.
2005/0238283 A1 10/2005 Faure et al.
2005/0240401 A1 10/2005 Ebenezer
2005/0251388 A1 11/2005 Lang et al.
2006/0009970 A1 1/2006 Harton et al.
2006/0034447 A1 2/2006 Alves et al.
2006/0074646 A1 4/2006 Alves et al.
2006/0100868 A1 5/2006 Hetherington et al.
2006/0115095 A1 6/2006 Giesbrecht et al.
2006/0116873 A1 6/2006 Hetherington et al.
2006/0136199 A1 6/2006 Nongpiur et al.
2006/0251268 A1 11/2006 Hetherington et al.
2006/0287859 A1 12/2006 Hetherington et al.
2007/0019835 A1 1/2007 de Roo et al.
2007/0033031 A1 2/2007 Zakarauskas
2007/0156401 A1 7/2007 Nagano et al.

FOREIGN PATENT DOCUMENTS

CA 2158064 10/1994
CN 1325222 A 12/2001
CN 1530929 A 9/2004
EP 0 076 687 A1 4/1983
EP 0 629 996 A2 12/1994
EP 0 629 996 A3 12/1994

(56) References Cited

FOREIGN PATENT DOCUMENTS

| | | | |
|---|---|---|---|
| EP | 0 750 291 | A1 | 12/1996 |
| EP | 1 450 353 | A1 | 8/2004 |
| EP | 1 450 354 | A1 | 8/2004 |
| EP | 1 669 983 | A1 | 6/2006 |
| JP | 64 039195 | | 2/1989 |
| JP | 06269084 | | 9/1994 |
| JP | 6282297 | | 10/1994 |
| JP | 6319193 | | 11/1994 |
| JP | 6349208 | | 12/1994 |
| JP | 2000-261530 | A | 9/2000 |
| JP | 2001-215992 | | 8/2001 |
| JP | 2001-350498 | A | 12/2001 |
| KR | 138806 | B1 | 6/1998 |
| WO | WO 00/41169 | A1 | 7/2000 |
| WO | WO 0156255 | A1 | 8/2001 |
| WO | WO 01/73761 | A1 | 10/2001 |

OTHER PUBLICATIONS

Diethorn, Eric J. "Subband noise reduction methods for speech enhancement." In Acoustic signal processing for telecommunication, pp. 155-178. Springer US, 2000.*

S. F. Boll, Suppression of Acoustic Noise in Speech Using Spectral Subtraction IEEE Trans. Acoust. Signal Proc., vol. ASSP-27, No. 2, Apr. 1979.*

Avendano, C. et al.; "Study on the Dereverberation of Speech Based on Temporal Envelope Filtering"; Proc. ICSLP '96; pp. 889-892; Oct. 1996.

Berk et al.; "Data Analysis with Microsoft Excel"; Duxbury Press; 1998; pp. 236-239 and 256-259.

Boll; "Suppression of Acoustic Noise in Speech Using Spectral Subtraction"; IEEE Trans. on Acoustics, Speech, and Signal Processing, vol. ASSP-27, No. 2; 1979; pp. 113-120.

Ephraim; "Statistical-Model-Based Speech Enhancement Systems"; Proceedings of the IEEE; vol. 80, No. 10; Oct. 1992; pp. 1526-1555.

Fiori, S. et al.; "Blind Deconvolution by Modified Bussgang Algorithm"; Dept. of Electronics and Automatics—University of Ancona (Italy); ISCAS 1999.

Godsill et al.; Digital Audio Restoration; Jun. 2, 1997; pp. 1-71.

Learned, R.E. et al.; "A Wavelet Packet Approach to Transient Signal Classification, Applied and Computational Harmonic Analysis"; Jul. 1995; pp. 265-278; vol. 2, No. 3; USA; XP 000972660; ISSN: 1063-5203; Abstract.

Ljung, Lennart, "System Identification Theory for the User, Second Edition" 1999, pp. 1-14, Prentice Hall PTR, Upper Saddle River, NJ.

Nakatani, T. et al.; Implementation and Effects of Single Channel Dereverberation Based on the Harmonic Structure of Speech; Proc. of IWAENC-2003; pp. 91-94; Sep. 2003.

Patent Abstracts of Japan, vol. 18, No. 681, Dec. 21, 1994; JP 06 269084, Sep. 22, 1994.

Pellom et al.; An Improved (Auto:I, LSP:T) Constrained Iterative Speech Enhancement for Colored Noise Environments; IEEE Transactions on Speech and Audio Processing; vol. 6, No. 6; Nov. 1998; pp. 573-579.

Purder, H. et al.; "Improved Noise Reduction for Hands-Free Car Phones Utilizing Information on Vehicle and Engine Speeds"; Sep. 4-8, 2000; pp. 1851-1854; vol. 3, XP009030255; 2000; Tampere, Finland; Tampere Univ. Technology; Finland Abstract.

Quatieri, T.F. et al.; "Noise Reduction Using a Soft-Dection/Decision Sine-Wave Vector Quantizer"; International Conference on Acoustics, Speech & Signal Processing; Apr. 3, 1990; pp. 821-824; vol. Conf. 15; IEEE ICASSP; New York, US; XP000146895, Abstract, Paragraph 3.1.

Quelavoine, R. et al.; "Transients Recognition in Underwater Acoustic with Multilayer Neural Networks, Engineering Benefits from Neural Networks"; Proceedings of the International Conference EANN, Gibraltar, Jun. 10-12, 1998; pp. 330-333; XP 000974500; Turku, Finland; Syst. Eng. Assoc., Finland; ISBN: 951-97868-0-5; Abstract, p. 30, paragraph 1.

Seely, S.; "An Introduction to Engineering Systems"; Pergamon Press Inc.; 1972; pp. 7-10.

Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.

Shust, Michael R. and Rogers, James C., "Electronic Removal of Outdoor Microphone Wind Noise", obtained from the Internet on Jul. 28, 2004 at: <http://www.acounstics.org/press/136th/mshust.htm>, 6 pages.

Simon, G.; "Detection of Harmonic Burst Signals"; International Journal Circuit Theroy and Applications; Jul. 1985, vol. 13, No. 3; pp. 195-201; UK; XP 000974305; ISSN: 0098-9886; Abstract.

Udrea, R. M. et al., "Speech Enhancement Using Spectral Over-Subtraction and Residual Noise Reduction," IEEE, 2003, pp. 165-168.

Vaseghi; "Advanced Digital Signal Processing and Noise Reduction"; Second Edition; John Wiley & Sons; 2000; pp. 1-395.

Vaseghi; Chapter 12 "Impulsive Noise"; "Advanced Digital Signal Processing and Noise Reduction"; 2nd ed.; John Wiley and Sons; 2000; pp. 355-377.

Viera, J.; "Automatic Estimation of Reverberation Time"; Audio Engineering Society, Convention Paper 6107; 116th Convention; May 8-11, 2004; Berlin, Germany; pp. 1-7.

Wahab A., et al.; "Intelligent Dashboard with Speech Enhancement"; Information, Communications and Signal Processing; 1997; ICICS.; Proceedings of 1997 International Conference on Singapore Sep. 9-12, 1997; New York, NY, USA; IEEE; pp. 993-997.

Zakarauskas, P.; "Detection and Localization of Nondeterministic Transients in Time Series and Application to Ice-Cracking Sound"; Digital Signal Processing; 1993; vol. 3, No. 1; pp. 36-45; Academic Press, Orlando, FL, USA; XP 000361270; ISSN: 1051-2004; entire document.

First Office Action for Canadian Patent Application No. 2458428, dated Apr. 25, 2008.

First Office Action for Canadian Patent Application No. 2458427, dated May 21, 2008.

First Office Action for Chinese Patent Application No. 200410004563.4, dated May 18, 2007.

First Office Action for Chinese Patent Application No. 200410004564.9, dated Feb. 2, 2007.

European Search Report for Application No. 04003675.8-2218, dated May 12, 2004.

Second Office Action for Chinese Patent Application No. 200410004564.9, dated Jul. 13, 2007.

European Search Report for EP 04003675.8, dated Apr. 30, 2004.

European Search Report for EP 04003811.9, dated May 12, 2004.

First Office Action for European Patent Application No. 04003811.9, dated Apr. 13, 2005.

First Office Action for European Patent Application No. 04003675.8, dated Jun. 7, 2005.

European Search Report for EP 05026904.2, dated Apr. 10, 2006.

First Office Action for European Patent Application No. 05028904.2, dated Jan. 10, 2007.

First Office Action for Japanese Patent Application No. 2004-45524, dated Jun. 27, 2008.

First Office Action for Japanese Patent Application No. 2004-43727, dated Jun. 30, 2008.

Second Office Action for Japanese Patent Application No. 2004-43727, dated Jan. 9, 2009.

First Office Action for Chinese Patent Application No. 2005100034687, dated Feb. 27, 2009 (5 pages).

* cited by examiner

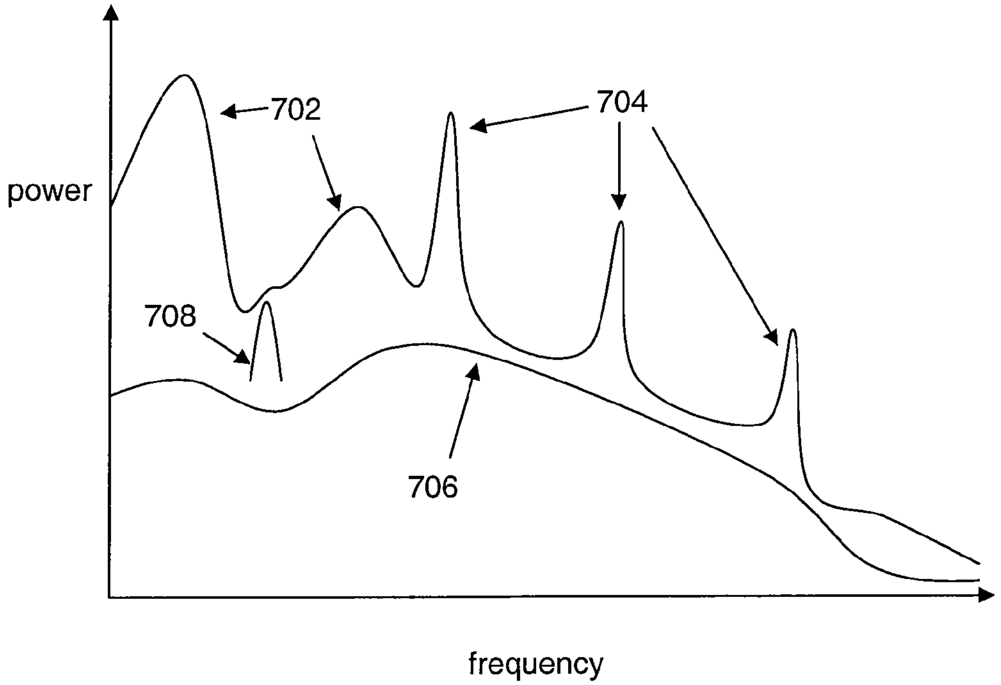
FIG. 7
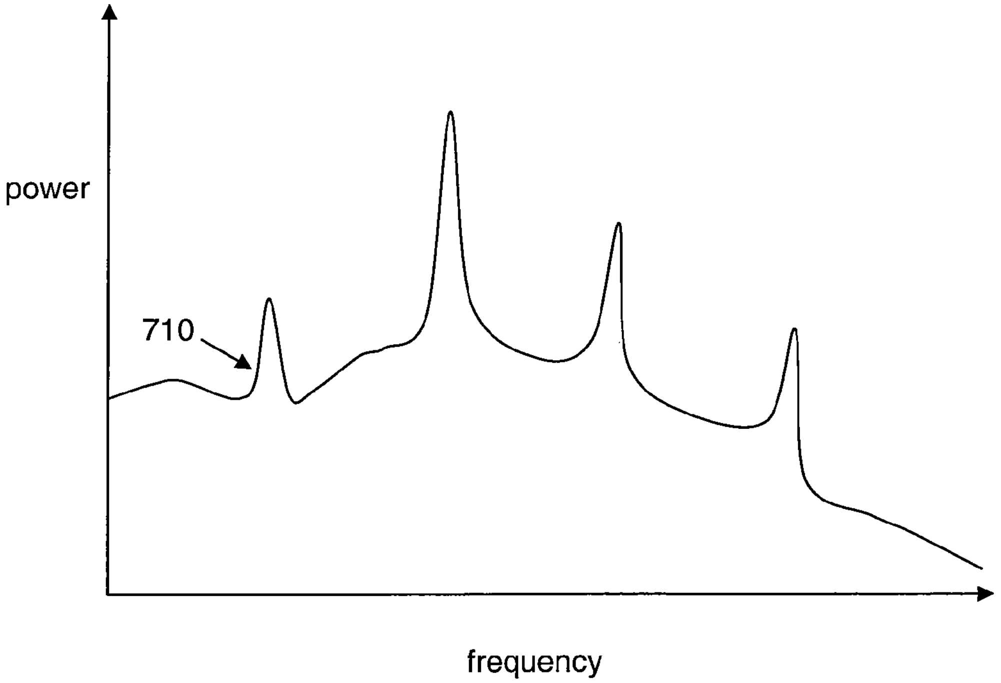

METHOD AND APPARATUS FOR SUPPRESSING WIND NOISE

PRIORITY CLAIM

This application is a continuation of U.S. patent application Ser. No. 10/410,736, "Method and Apparatus for Suppressing Wind Noise," filed Apr. 10, 2003, now U.S. Pat. No. 7,885,420 which claims the benefit of U.S. Provisional Patent Application No. 60/449,511 filed Feb. 21, 2003, and which is incorporated herein by reference.

BACKGROUND OF THE INVENTION

1. Field of the Invention

The present invention relates to the field of acoustics, and in particular to a method and apparatus for suppressing wind noise.

2. Description of Related Art

When using a microphone in the presence of wind or strong airflow, or when the breath of the speaker hits a microphone directly, a distinct impulsive low-frequency puffing sound can be induced by wind pressure fluctuations at the microphone. This puffing sound can severely degrade the quality of an acoustic signal. Most solutions to this problem involve the use of a physical barrier to the wind, such as fairing, open cell foam, or a shell around the microphone. Such a physical barrier is not always practical or feasible. The physical barrier methods also fail at high wind speed. For this reason, prior art contains methods to electronically suppress wind noise.

For example, Shust and Rogers in "Electronic Removal of Outdoor Microphone Wind Noise"—Acoustical Society of America 136$^{th}$ meeting held Oct. 13, 1998 in Norfold, Va. Paper 2pSPb3, presented a method that measures the local wind velocity using a hot-wire anemometer to predict the wind noise level at a nearby microphone. The need for a hot-wire anemometer limits the application of that invention. Two patents, U.S. Pat. No. 5,568,559 issued Oct. 22, 1996, and U.S. Pat. No. 5,146,539 issued Dec. 23, 1997, both require that two microphones be used to make the recordings and cannot be used in the common case of a single microphone.

These prior art inventions require the use of special hardware, severely limiting their applicability and increasing their cost. Thus, it would be advantageous to analyze acoustic data and selectively suppress wind noise, when it is present, while preserving signal without the need for special hardware.

SUMMARY OF THE INVENTION

The invention includes a method, apparatus, and computer program to suppress wind noise in acoustic data by analysis-synthesis. The input signal may represent human speech, but it should be recognized that the invention could be used to enhance any type of narrow band acoustic data, such as music or machinery. The data may come from a single microphone, but it could as well be the output of combining several microphones into a single processed channel, a process known as "beamforming". The invention also provides a method to take advantage of the additional information available when several microphones are employed.

The preferred embodiment of the invention attenuates wind noise in acoustic data as follows. Sound input from a microphone is digitized into binary data. Then, a time-frequency transform (such as short-time Fourier transform) is applied to the data to produce a series of frequency spectra. After that, the frequency spectra are analyzed to detect the presence of wind noise and narrow-band signal, such as voice, music, or machinery. When wind noise is detected, it is selectively suppressed. Then, in places where the signal is masked by the wind noise, the signal is reconstructed by extrapolation to the times and frequencies. Finally, a time series that can be listened to is synthesized. In another embodiment of the invention, the system suppresses all low frequency wide-band noise after having performed a time-frequency transform, and then synthesizes the signal.

The invention has the following advantages: no special hardware is required apart from the computer that is performing the analysis. Data from a single microphone is necessary but it can also be applied when several microphones are available. The resulting time series is pleasant to listen to because the loud wind puffing noise has been replaced by near-constant low-level noise and signal.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete description of the present invention and further aspects and advantages thereof, reference is now made to the following drawings in which:

FIG. 7 illustrates the basic principles of wind noise attenuation.

DETAILED DESCRIPTION OF THE INVENTION

A method, apparatus and computer program for suppressing wind noise is described. In the following description, numerous specific details are set forth in order to provide a more detailed description of the invention. It will be apparent, however, to one skilled in the art, that the present invention may be practiced without these specific details. In other instances, well known details have not been provided so as to not obscure the invention.

Overview of Operating Environment

Figure 1:
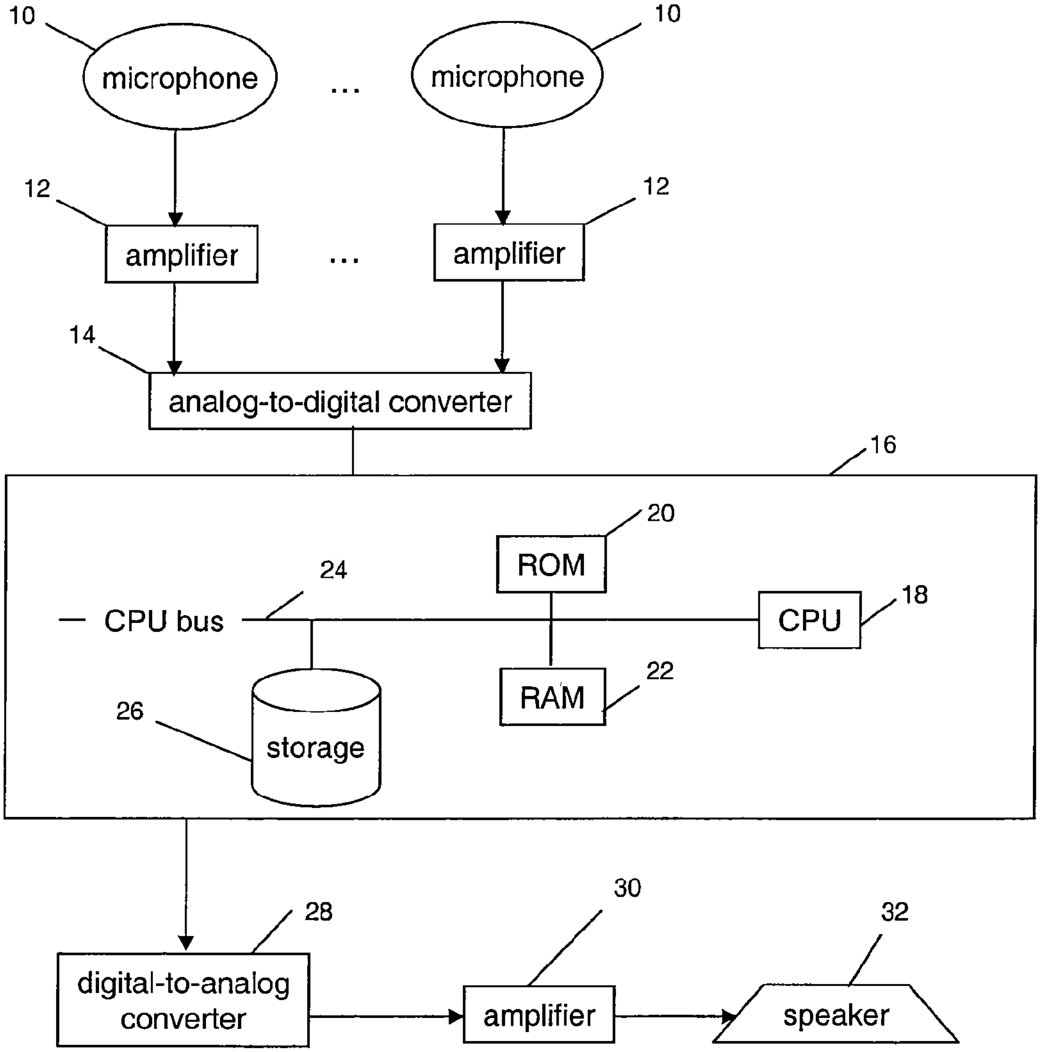
FIG. 1 is a block diagram of a programmable computer system suitable for implementing the wind noise attenuation method of the invention.

FIG. 1 shows a block diagram of a programmable processing system which may be used for implementing the wind noise attenuation system of the invention. An acoustic signal is received at a number of transducer microphones 10, of which there may be as few as a single one. The transducer microphones generate a corresponding electrical signal representation of the acoustic signal. The signals from the transducer microphones 10 are then preferably amplified by associated amplifiers 12 before being digitized by an analog-to-digital converter 14. The output of the analog-to-digital converter 14 is applied to a processing system 16, which applies the wind attenuation method of the invention. The processing system may include a CPU 18, ROM 20, RAM 22 (which may be writable, such as a flash ROM), and an optional storage device 26, such as a magnetic disk, coupled by a CPU bus 24 as shown.

The output of the enhancement process can be applied to other processing systems, such as a voice recognition system, or saved to a file, or played back for the benefit of a human listener. Playback is typically accomplished by converting the processed digital output stream into an analog signal by means of a digital-to-analog converter 28, and amplifying the analog signal with an output amplifier 30 which drives an audio speaker 32 (e.g., a loudspeaker, headphone, or earphone).

Functional Overview of System

Figure 2:
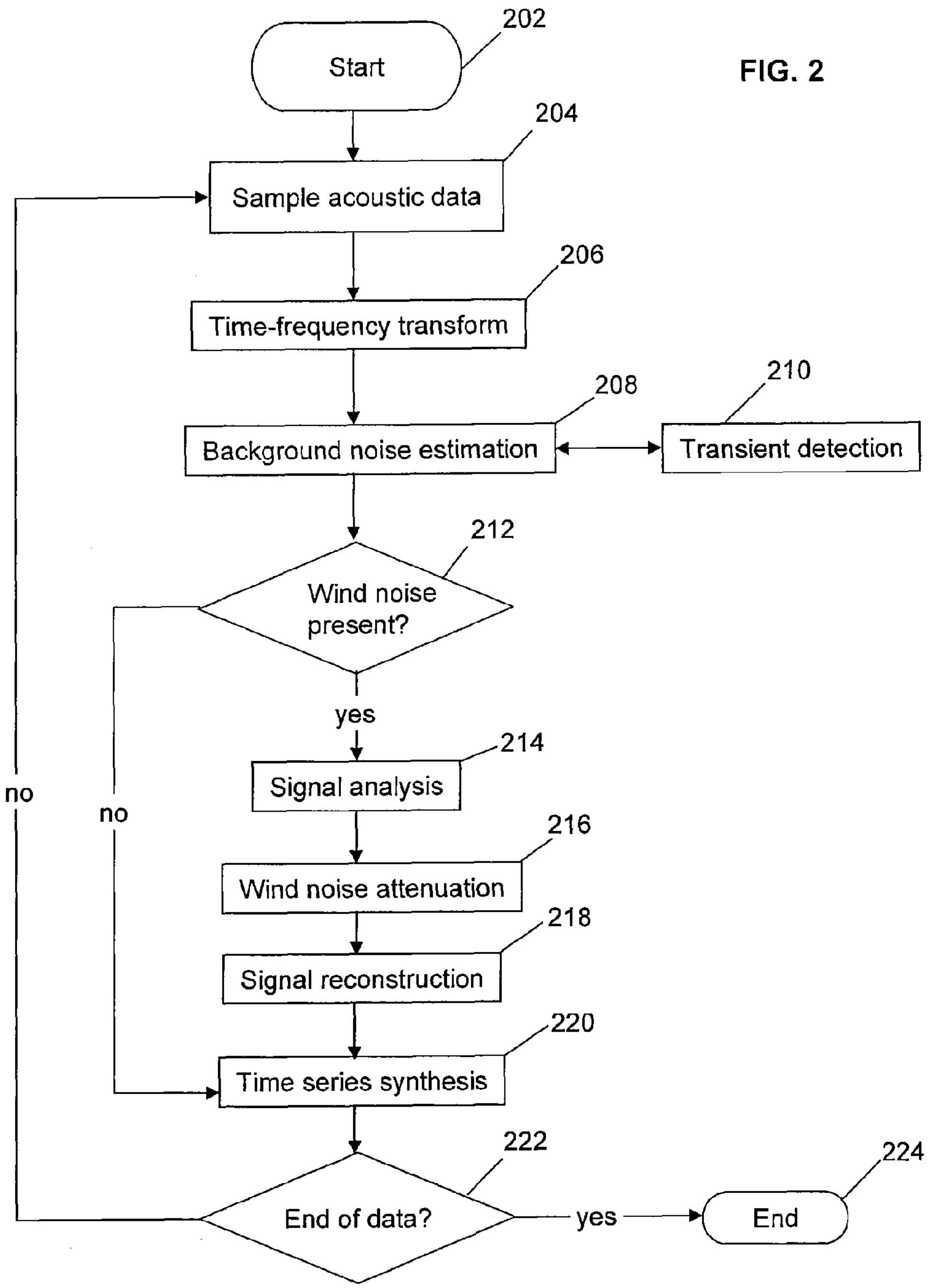
FIG. 2 is a flow diagram of the preferred embodiment of the invention.

One embodiment of the wind noise suppression system of the present invention is comprised of the following components. These components can be implemented in the signal processing system as described in FIG. 1 as processing software, hardware processor or a combination of both. FIG. 2 describes how these components work together to perform the task wind noise suppression.

A first functional component of the invention is a time-frequency transform of the time series signal.

A second functional component of the invention is background noise estimation, which provides a means of estimating continuous or slowly varying background noise. The dynamic background noise estimation estimates the continuous background noise alone. In the preferred embodiment, a power detector acts in each of multiple frequency bands. Noise-only portions of the data are used to generate the mean of the noise in decibels (dB).

The dynamic background noise estimation works closely with a third functional component, transient detection. Preferably, when the power exceeds the mean by more than a specified number of decibels in a frequency band (typically 6 to 12 dB), the corresponding time period is flagged as containing a transient and is not used to estimate the continuous background noise spectrum.

The fourth functional component is a wind noise detector. It looks for patterns typical of wind buffets in the spectral domain and how these change with time. This component helps decide whether to apply the following steps. If no wind buffeting is detected, then the following components can be optionally omitted.

A fifth functional component is signal analysis, which discriminates between signal and noise and tags signal for its preservation and restoration later on.

The sixth functional component is the wind noise attenuation. This component selectively attenuates the portions of the spectrum that were found to be dominated by wind noise, and reconstructs the signal, if any, that was masked by the wind noise.

The seventh functional component is a time series synthesis. An output signal is synthesized that can be listened to by humans or machines.

A more detailed description of these components is given in conjunction with FIGS. 2 through 7.

Wind Suppression Overview

FIG. 2 is a flow diagram showing how the components are used in the invention. The method shown in FIG. 2 is used for enhancing an incoming acoustic signal corrupted by wind noise, which consists of a plurality of data samples generated as output from the analog-to-digital converter 14 shown in FIG. 1. The method begins at a Start state (step 202). The incoming data stream (e.g., a previously generated acoustic data file or a digitized live acoustic signal) is read into a computer memory as a set of samples (step 204). In the preferred embodiment, the invention normally would be applied to enhance a "moving window" of data representing portions of a continuous acoustic data stream, such that the entire data stream is processed. Generally, an acoustic data stream to be enhanced is represented as a series of data "buffers" of fixed length, regardless of the duration of the original acoustic data stream. In the preferred embodiment, the length of the buffer is 512 data points when it is sampled at 8 or 11 kHz. The length of the data point scales in proportion of the sampling rate.

The samples of a current window are subjected to a time-frequency transformation, which may include appropriate conditioning operations, such as pre-filtering, shading, etc. (206). Any of several time-frequency transformations can be used, such as the short-time Fourier transform, bank of filter analysis, discrete wavelet transform, etc. The result of the time-frequency transformation is that the initial time series x(t) is transformed into transformed data. Transformed data comprises a time-frequency representation X(f, i), where t is the sampling index to the time series x, and f and i are discrete variables respectively indexing the frequency and time dimensions of X. The two-dimensional array X(f,i) as a function of time and frequency will be referred to as the "spectrogram" from now on. The power levels in individual bands f are then subjected to background noise estimation (step 208) coupled with transient detection (step 210). Transient detection looks for the presence of transient signals buried in stationary noise and determines estimated starting and ending times for such transients. Transients can be instances of the sought signal, but can also be "puffs" induced by wind, i.e. instance of wind noise, or any other impulsive noise. The background noise estimation updates the estimate of the background noise parameters between transients. Because background noise is defined as the continuous part of the noise, and transients as anything that is not continuous, the two needed to be separated in order for each to be measured. That is why the background estimation must work in tandem with the transient detection.

An embodiment for performing background noise estimation comprises a power detector that averages the acoustic power in a sliding window for each frequency band f. When the power within a predetermined number of frequency bands exceeds a threshold determined as a certain number c of decibels above the background noise, the power detector declares the presence of a transient, i.e., when:

$$X(f,i)>B(f)+c, \tag{1}$$

where B(f) is the mean background noise power in band f and c is the threshold value. B(f) is the background noise estimate that is being determined.

Once a transient signal is detected, background noise tracking is suspended. This needs to happen so that transient signals do not contaminate the background noise estimation process. When the power decreases back below the threshold, then the tracking of background noise is resumed. The threshold value c is obtained, in one embodiment, by measuring a few initial buffers of signal assuming that there are no transients in them. In one embodiment, c is set to a range between 6 and 12 dB. In an alternative embodiment, noise estimation need not be dynamic, but could be measured once (for example, during boot-up of a computer running software implementing the invention), or not necessarily frequency dependent.

Next, in step 212, the spectrogram X is scanned for the presence of wind noise. This is done by looking for spectral patterns typical of wind noise and how these change with time. This components help decide whether to apply the following steps. If no wind noise is detected, then the steps 214, 216, and 218 can be omitted and the process skips to step 220.

If wind noise is detected, the transformed data that has triggered the transient detector is then applied to a signal analysis function (step 214). This step detects and marks the signal of interest, allowing the system to subsequently preserve the signal of interest while attenuating wind noise. For example, if speech is the signal of interest, a voice detector is applied in step 214. This step is described in more details in the section titled "Signal Analysis."

Next, a low-noise spectrogram C is generated by selectively attenuating X at frequencies dominated by wind noise (step 216). This component selectively attenuates the portions of the spectrum that were found to be dominated by wind noise while preserving those portions of the spectrum that were found to be dominated by signal. The next step, signal reconstruction (step 218), reconstructs the signal, if any, that was masked by the wind noise by interpolating or extrapolating the signal components that were detected in periods between the wind buffets. A more detailed description of the wind noise attenuation and signal reconstruction steps are given in the section titled "Wind Noise Attenuation and Signal Reconstruction."

In step 220, a low-noise output time series y is synthesized. The time series y is suitable for listening by either humans or an Automated Speech Recognition system. In the preferred embodiment, the time series is synthesized through an inverse Fourier transform.

In step 222, it is determined if any of the input data remains to be processed. If so, the entire process is repeated on a next sample of acoustic data (step 204). Otherwise, processing ends (step 224). The final output is a time series where the wind noise has been attenuated while preserving the narrow band signal.

The order of some of the components may be reversed or even omitted and still be covered by the present invention. For example, in some embodiment the wind noise detector could be performed before background noise estimation, or even omitted entirely.

Signal Analysis

The preferred embodiment of signal analysis makes use of at least three different features for distinguishing narrow band signals from wind noise in a single channel (microphone) system. An additional fourth feature can be used when more than one microphone is available. The result of using these features is then combined to make a detection decision. The features comprise:

1) the peaks in the spectrum of narrow band signals are harmonically related, unlike those of wind noise 2) their frequencies are narrower those of wind noise, 3) they last for longer periods of time than wind noise, 4) the rate of change of their positions and amplitudes are less drastic than that of wind noise, and 5) (multi-microphone only) they are more strongly correlated among microphones than wind noise.

The signal analysis (performed in step 214) of the present invention takes advantage of the quasi-periodic nature of the signal of interest to distinguish from non-periodic wind noises. This is accomplished by recognizing that a variety of quasi-periodic acoustical waveforms including speech, music, and motor noise, can be represented as a sum of slowly-time-varying amplitude, frequency and phase modulated sinusoids waves:

$$s(n) = \sum_{k=1}^{K} A_k \cos(2\pi nkf_0 + \psi_k) \quad (2)$$

in which the sine-wave frequencies are multiples of the fundamental frequency $f_0$ and $A_k(n)$ is the time-varying amplitude for each component.

The spectrum of a quasi-periodic signal such as voice has finite peaks at corresponding harmonic frequencies. Furthermore, all peaks are equally distributed in the frequency band and the distance between any two adjacent peaks is determined by the fundamental frequency.

In contrast to quasi-periodic signal, noise-like signals, such as wind noise, have no clear harmonic structure. Their frequencies and phases are random and vary within a short time. As a result, the spectrum of wind noise has peaks that are irregularly spaced.

Besides looking at the harmonic nature of the peaks, three other features are used. First, in most case, the peaks of wind noise spectrum in low frequency band are wider than the peaks in the spectrum of the narrow band signal, due to the overlapping effect of close frequency components of the noise. Second, the distance between adjacent peaks of the wind noise spectra is also inconsistent (non-constant). Finally, another feature that is used to detect narrow band signals is their relative temporal stability. The spectra of narrow band signals generally change slower than that of wind noise. The rate of change of the peaks positions and amplitudes are therefore also used as features to discriminate between wind noise and signal.

Examples of Signal Analysis

Figure 3:
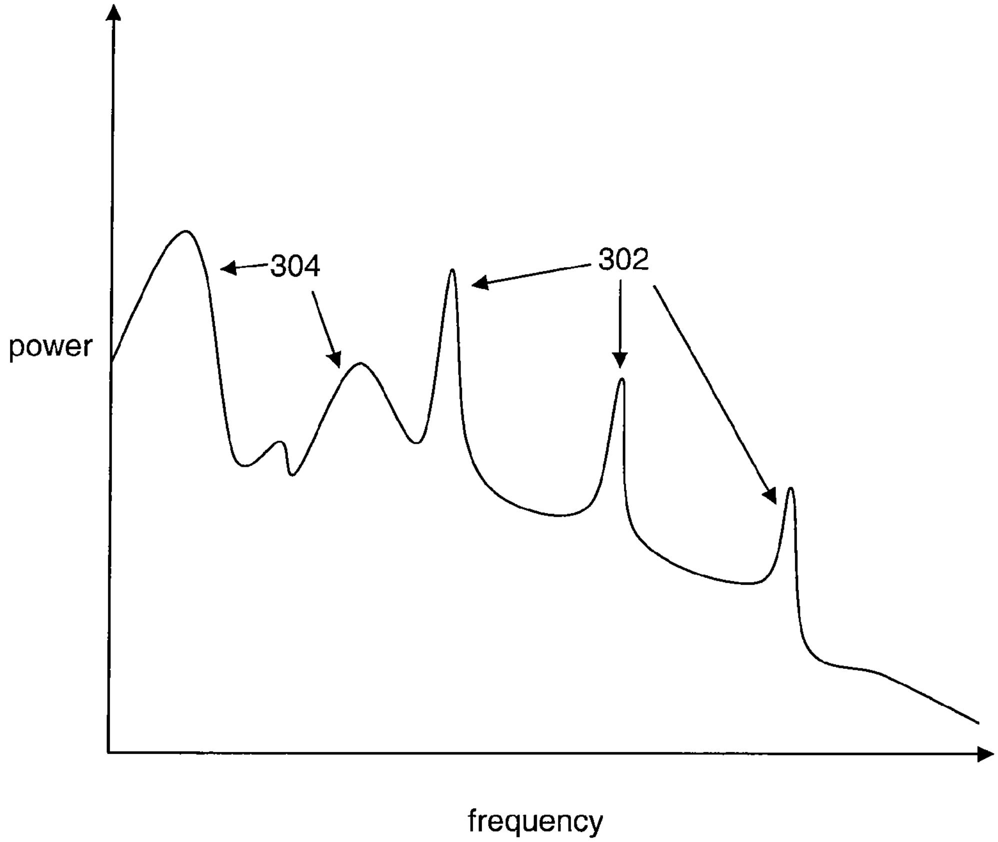
FIG. 3 illustrates the basic principles of signal analysis for a single channel of acoustic data.

FIG. 3 illustrates some of the basic spectral features that are used in the present invention to discriminate between wind noise and the signal of interest when only a single channel is present. The approach taken here is based on heuristic. In particular, it is based on the observation that when looking at the spectrogram of voiced speech or sustained music, a number of narrow peaks 302 can usually be detected. On the other hand, when looking at the spectrogram of wind noise, the peaks 304 are broader than those of speech 302. The present invention measures the width of each peak and the distance between adjacent peaks of the spectrogram and classifies them into possible wind noise peaks or possible harmonic peaks according to their patterns. Thus the distinction between wind noise and signal of interest can be made.

Figure 4:
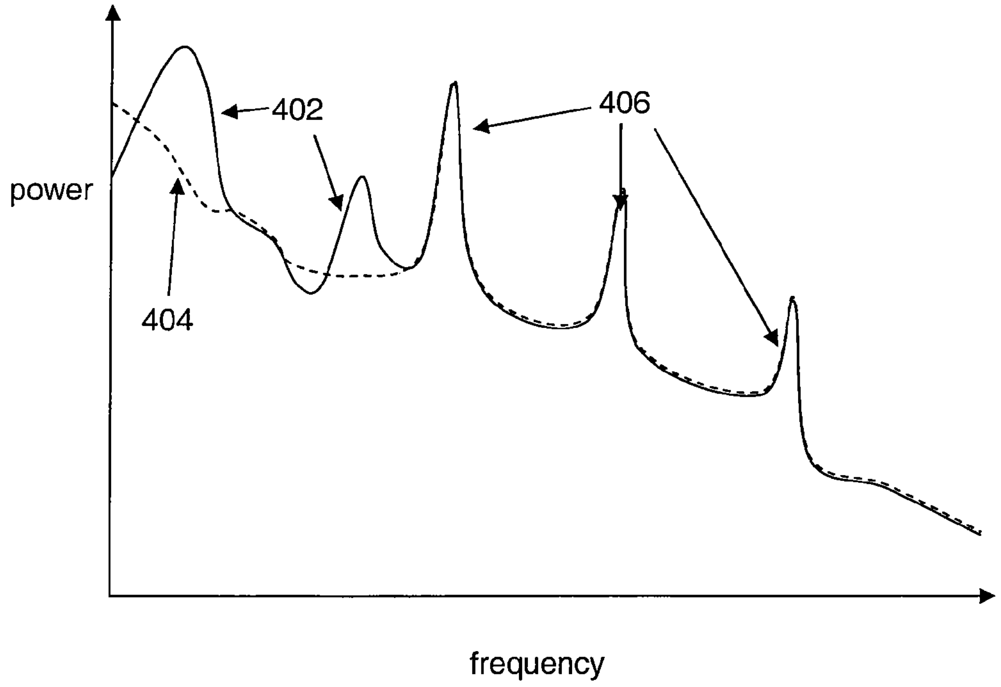
FIG. 4 illustrates the basic principles of signal analysis for multiple microphones.

FIG. 4 is an example signal diagram that illustrates some of the basic spectral features that are used in the present invention to discriminate between wind noise and the signal of interest when more than one microphone are available. The solid line denotes the signal from one microphone and the dotted line denoted the signal from another nearby microphone.

When there are more than one microphone present, the method uses an additional feature to distinguish wind noise in addition to the heuristic rules described in FIG. 3. The feature is based on observation that, depending on the separation between the microphones, certain maximum phase and amplitude difference are expected for acoustic signals (i.e. the signal is highly correlated between the microphones). In contrast, since wind noise is generated from chaotic pressure fluctuations at the microphone membranes, the pressure variations it generates are uncorrelated between the microphones. Therefore, if the phase and amplitude differences between spectral peaks 402 and the corresponding spectrum 404 from the other microphone exceed certain threshold values, the corresponding peaks are almost certainly due to wind noise. The differences can thus be labeled for attenuation. Conversely, if the phase and amplitude differences between spectral peaks 406 and the corresponding spectrum 404 from the other microphone is below certain threshold values, then the corresponding peaks are almost certainly due to acoustic signal. The differences can be thus labeled for preservation and restoration.

Signal Analysis Implementation

Figure 5A:
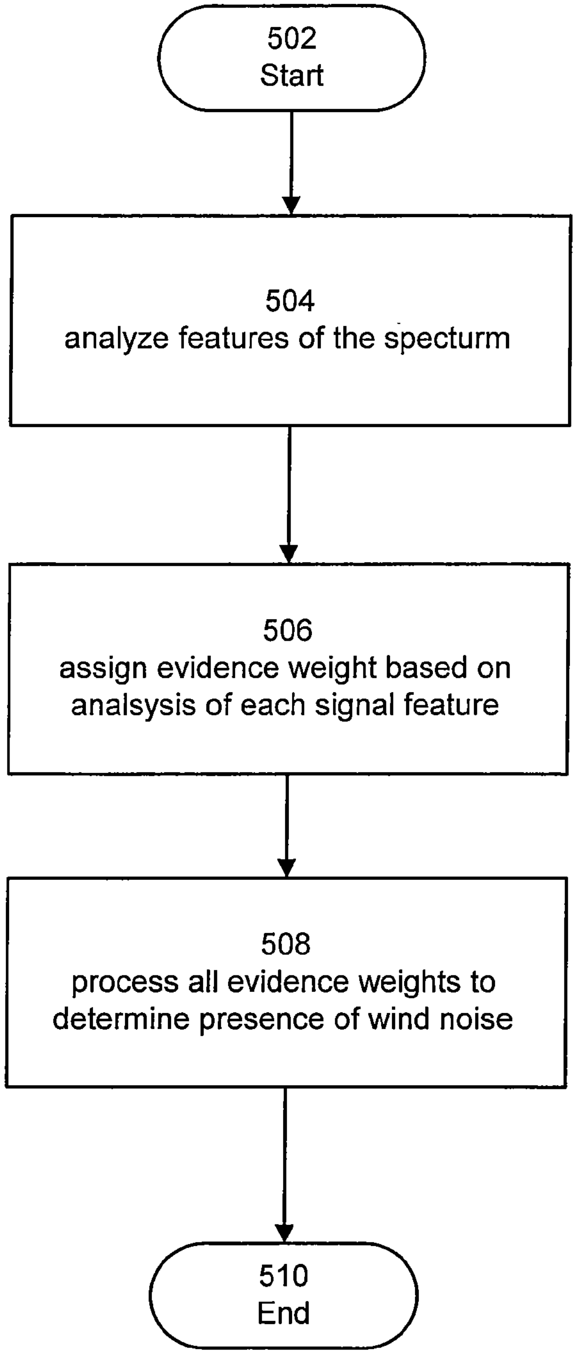
FIG. 5A is a flow diagram showing the operation of signal analyzer.

FIG. 5A is a flow chart that shows how the narrow band signal detector analyzes the signal. In step 504, various characteristics of the spectrum are analyzed. Then in step 506, an evidence weight is assigned based on the analysis on each signal feature. Finally in step 508, all the evidence weights are processed to determine whether signal has wind noise.

In one embodiment, any one of the following features can be used alone or in any combination thereof to accomplish step 504:

1) finding all peaks in spectra having SNR>T 2) measuring peak width as a way to determine whether the peaks are stemming from wind noise 3) measuring the harmonic relationship between peaks 4) comparing peaks in spectra of the current buffer to the spectra from the previous buffer 5) comparing peaks in spectra from different microphones (if more than one microphone is used).

Figure 5B:
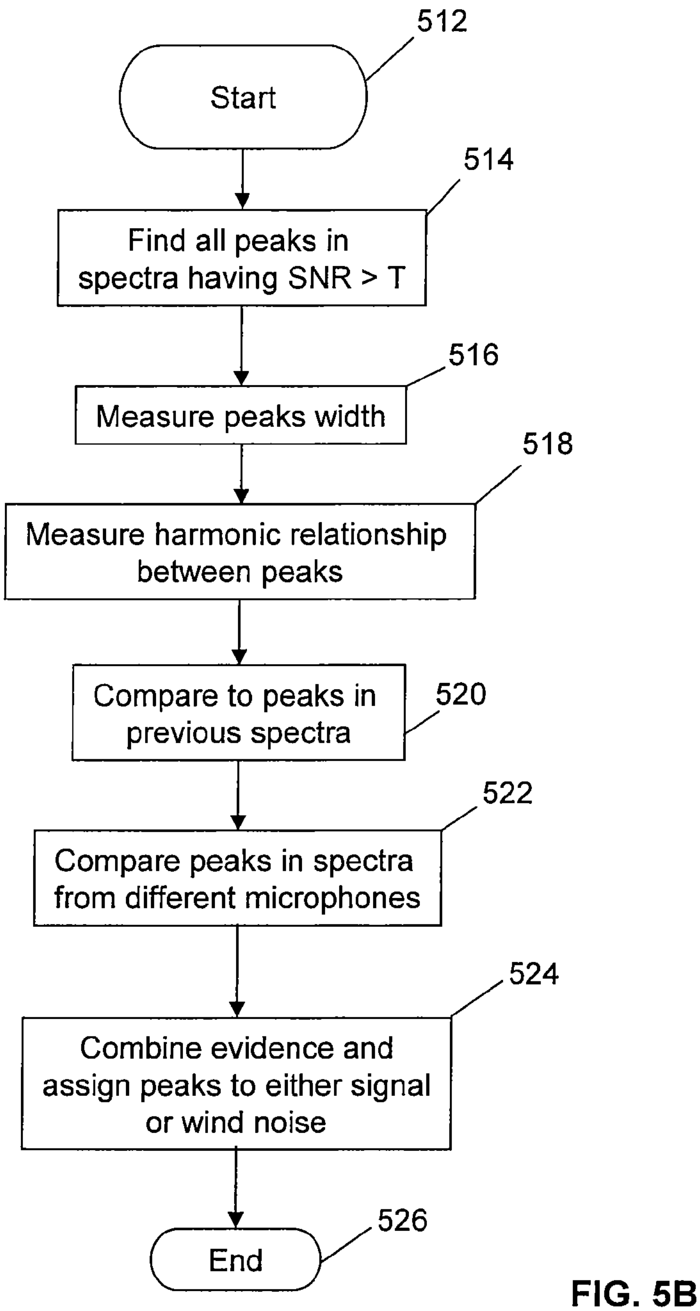
FIG. 5B is a flow diagram showing how the signal features are used in signal analysis according to one embodiment of the present invention.

FIG. 5B is a flow chart that shows how the narrow band signal detector uses various features to distinguish narrow band signals from wind noise in one embodiment. The detector begins at a Start state (step 512) and detects all peaks in the spectra in step 514. All peaks in the spectra having Signal-to-Noise Ratio (SNR) over a certain threshold T are tagged. Then in step 516, the width of the peaks is measured. In one embodiment, this is accomplished by taking the average difference between the highest point and its neighboring points on each side. Strictly speaking, this method measures the height of the peaks. But since height and width are related, measuring the height of the peaks will yield a more efficient analysis of the width of the peaks. In another embodiment, the algorithm for measuring width is as follows:

Given a point of the spectrum s(i) at the i th frequency bin, it is considered a peak if and only if:

$$s(i)>s(i-1) \tag{3}$$

and $$s(i)>s(i+1). \tag{4}$$

Furthermore, a peak is classified as being voice (i.e. signal of interest) if:

$$s(i)>s(i-2)+7\text{ dB} \tag{5}$$

and $$s(i)>s(i+2)+7\text{ dB}. \tag{6}$$

Otherwise the peak is classified as noise (e.g. wind noise). The numbers shown in the equation (e.g. i+2, 7 dB) are just in this one example embodiment and can be modified in other embodiments. Note that the peak is classified as a peak stemming from signal of interest when it is sharply higher than the neighboring points (equations 5 and 6). This is consistent with the example shown in FIG. 3, where peaks 302 from signal of interest are sharp and narrow. In contrast, peaks 304 from wind noise are wide and not as sharp. The algorithm above can distinguish the difference.

Following along again in FIG. 5, in step 518 the harmonic relationship between peaks is measured. The measurement between peaks is preferably implemented through applying the direct cosine transform (DCT) to the amplitude spectrogram X(f, i) along the frequency axis, normalized by the first value of the DCT transform. If voice (i.e. signal of interest) dominates during at least some region of the frequency domain, then the normalized DCT of the spectrum will exhibit a maximum at the value of the pitch period corresponding to acoustic data (e.g. voice). The advantage of this voice detection method is that it is robust to noise interference over large portions of the spectrum. This is because, for the normalized DCT to be high, there must be good SNR over portions of the spectrum.

In step 520, the stability of the peaks in narrow band signals is then measured. This step compares the frequency of the peaks in the previous spectra to that of the present one. Peaks that are stable from buffer to buffer receive added evidence that they belong to an acoustic source and not to wind noise.

Finally, in step 522, if signals from more than one microphone are available, the phase and amplitudes of the spectra at their respective peaks are compared. Peaks whose amplitude or phase differences exceed certain threshold are considered to belong to wind noise. On the other hand, peaks whose amplitude or phase differences come under certain thresholds are considered to belong to an acoustic signal. The evidence from these different steps are combined in step 524, preferably by a fuzzy classifier, or an artificial neural network, giving the likelihood that a given peak belong to either signal or wind noise. Signal analysis ends at step 526.

Wind Noise Detection

Figure 6A:
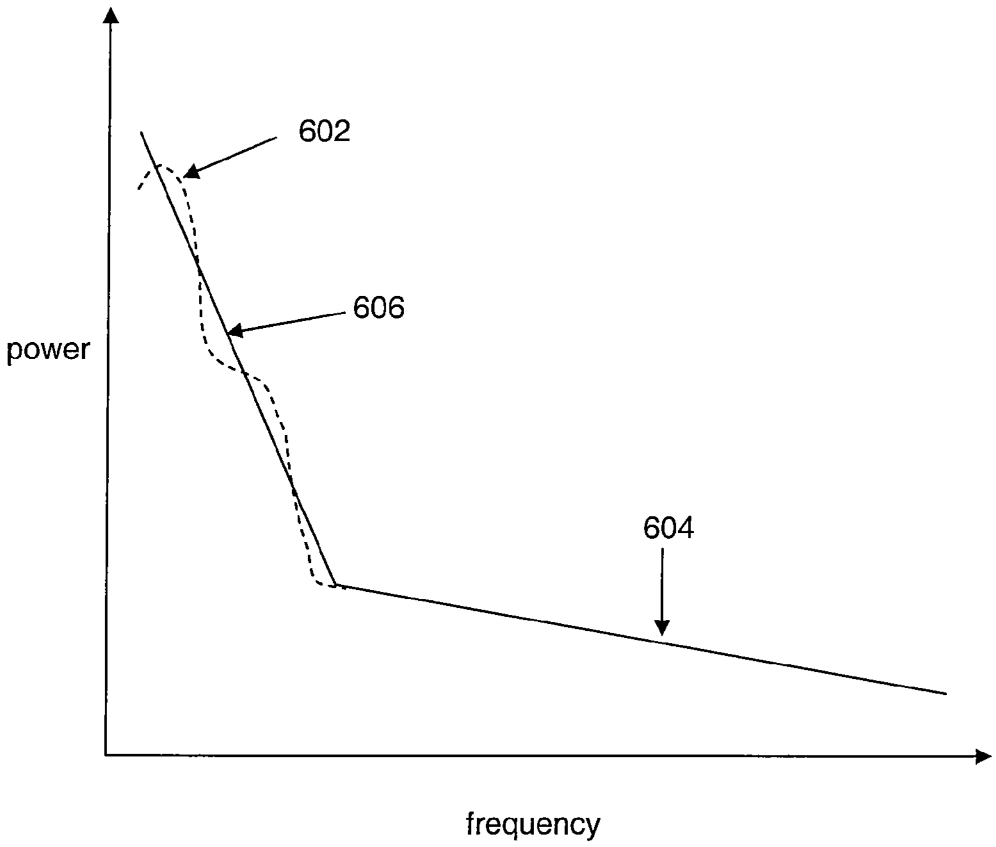
FIG. 6A illustrates the basic principles of wind noise detection.
Figure 6B:
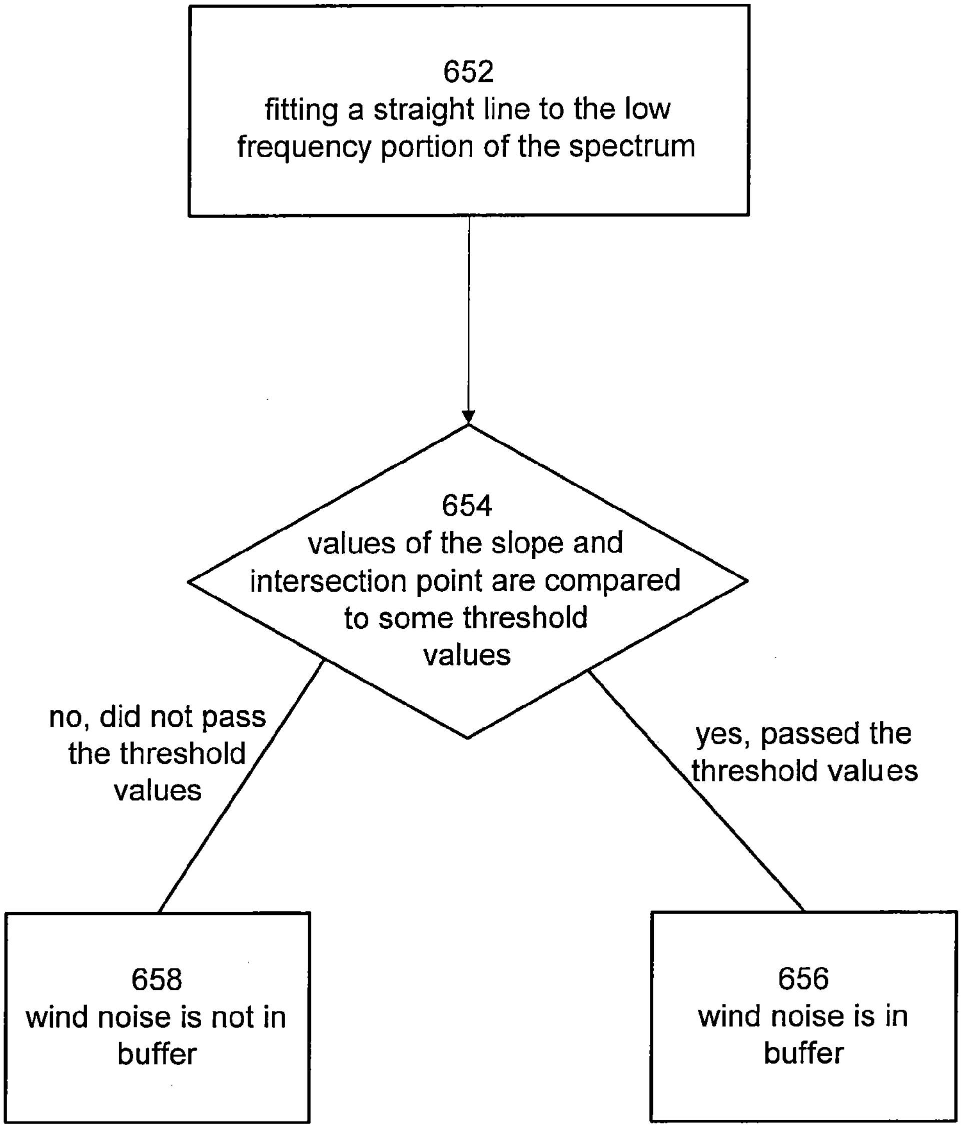
FIG. 6B is a flow chart showing the steps involved in wind noise detection.

FIGS. 6A and 6B illustrate the principles of wind noise detection (step 212 of FIG. 2). As illustrated in FIG. 6A, the spectrum of wind noise 602 (dotted line) has, in average, a constant negative slope across frequency (when measured in dB) until it reaches the value of the continuous background noise 604. FIG. 6B shows the process of wind noise detection. In the preferred embodiment, in step 652, the presence of wind noise is detected by first fitting a straight line 606 to the low-frequency portion 602 of the spectrum (e.g. below 500 Hz). The values of the slope and intersection point are then compared to some threshold values in step 654. If they are found to both pass that threshold, the buffer is declared to contain wind noise in step 656. If not, then the buffer is not declared to contain any wind noise (step 658).

Wind Noise Attenuation and Signal Reconstruction

FIG. 7 illustrates an embodiment of the present invention to selectively attenuate wind noise while preserving and reconstructing the signal of interest. Peaks that are deemed to be caused by wind noise (702) by signal analysis step 214 are attenuated. On the other hand peaks that are deemed to be from the signal of interest (704) are preserved. The value to which the wind noise is attenuated is the greatest of the follow two values: (1) that of the continuous background noise (706) that was measured by the background noise estimator (step 208 of FIG. 2), or (2) the extrapolated value of the signal (708) whose characteristics were determined by the signal analysis (step 214 of FIG. 2). The output of the wind noise attenuator is a spectrogram (710) that is consistent with the measured continuous background noise and signal, but that is devoid of wind noise.

Computer Implementation

The invention may be implemented in hardware or software, or a combination of both (e.g., programmable logic arrays). Unless otherwise specified, the algorithms included as part of the invention are not inherently related to any particular computer or other apparatus. In particular, various general-purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), and at least one microphone input. The program code is executed on the processors to perform the functions described herein.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., solid state, magnetic or optical media) readable by a general or special purpose programmable computer, for configuring and operating the computer when the storage media or device is read by the computer to perform the procedures described herein. For example, the compute program can be stored in storage 26 of FIG. 1 and executed in CPU 18. The present invention may also be considered to be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention. The invention is defined by the following claims and their full scope and equivalents.

What is claimed is:

1. A method for attenuating noise in a signal detected by a sound detector, comprising:

converting the signal detected by the sound detector into a set of digital samples representing a single channel of acoustic data associated with a single microphone;

storing the set of digital samples in a data storage device;

performing a time-frequency transform on the set of digital samples to obtain transformed data;

performing signal analysis on the transformed data, by a hardware processor, to identify wind noise in the transformed data, where the step of performing the signal analysis comprises:

measuring one or more characteristics of the transformed data by the hardware processor by identifying signal segments of the signal that lack a time-varying quasi-periodic amplitude and phase and designating those signal segments as wind noise associated with wind striking a portion of the sound detector; and discriminating between the wind noise and a signal of interest in the transformed data by comparing the harmonic structure of the signal segments of the signal to the harmonic structure of other signal segments of the signal that have a time varying periodic amplitude and a phase modulated sinusoid characteristic by the hardware processor; and attenuating at least a portion of the wind noise identified in the transformed data at frequencies dominated by wind noise;

where the discriminating between the wind noise and the signal of interest occurs on the output of the single microphone that sources the single channel of the acoustic data.

2. The method of claim 1, where the step of performing signal analysis further comprises:

analyzing features of a spectrum of the transformed data;

assigning evidence weights based on the step of analyzing; and processing the evidence weights to determine whether wind noise is present in the spectrum of the transformed data.

3. The method of claim 1, where the step of performing signal analysis further comprises identifying peaks in a spectrum of the transformed data that have a Signal to Noise Ratio (SNR) exceeding a peak threshold as peaks not stemming from wind noise.

4. The method of claim 1, where the step of performing signal analysis further comprises identifying peaks in a spectrum of the transformed data that are sharper and narrower than a selected criteria as peaks stemming from a signal of interest.

5. The method of claim 4, where the step of identifying comprises measuring peak widths by taking an average difference between a highest point and its neighboring points on each side.

6. The method of claim 1, where the step of performing signal analysis further comprises:

determining a stability of peaks by comparing peaks in a current spectra of the transformed data to peaks from a previous spectra of the transformed data; and identifying stable peaks as peaks not stemming from wind noise.

7. The method of claim 1, where the step of performing signal analysis further comprises:

identifying peaks whose phase and amplitude differences exceed a difference threshold as peaks stemming from wind noise.

8. The method of claim 1, where the step of performing signal analysis further comprises:

fitting a line to a portion of a spectrum of the transformed data;

comparing a slope of the line to a pre-defined threshold; and determining whether wind noise is present in the spectrum of the transformed data based on the slope.

9. The method of claim 1, where the step of performing signal analysis further comprises:

fitting a line to a portion of a spectrum of the transformed data;

comparing an intersection point of the line to a pre-defined threshold; and determining whether wind noise is present in the spectrum of the transformed data based on the intersection point.

10. An apparatus comprising a single channel of acoustic data from a single microphone, comprising:

a data storage device for storing digital data;

a time-frequency transform component configured to transform signals sourced from a single channel of acoustic data into frequency-based digital data representing the single channel of acoustic data associated with the single microphone;

a signal analyzer configured to identify wind noise in the frequency-based digital data, where the signal analyzer comprises a hardware processor configured to store and measure one or more characteristics of the frequency-based digital data indicative of wind pressure fluctuations associated with wind striking a portion of the single microphone by identifying signal segments of the signal that lack a time-varying quasi-periodic amplitude and phase and discriminate between the wind noise and a signal of interest in the frequency-based digital data by comparing the harmonic structure of the signal segments of the signal to the harmonic structure of other signal segments of the signal that have a time varying periodic amplitude and a phase modulated sinusoid characteristic; and a wind noise attenuation component configured to attenuate at least a portion of the wind noise in the frequency-based digital data using results obtained from the signal analyzer;

where the signal analyzer discriminates between the wind noise and the signal of interest by processing the output of the single microphone that sources the single channel of the acoustic data.

11. The apparatus of claim 10, where the signal analyzer is configured to:

analyze features of a spectrum of the frequency-based digital data;

assigning evidence weights based on the step of analyzing; and processing the evidence weights to determine whether wind noise is present in the spectrum of the frequency-based digital data.

12. The apparatus of claim 10, where the signal analyzer is configured to identify peaks in a spectrum of the frequency-based digital data that have a Signal to Noise Ratio (SNR) exceeding a peak threshold as peaks not stemming from wind noise.

13. The apparatus of claim 10, where the signal analyzer is configured to identify peaks in a spectrum of the frequency-based digital data that are sharper and narrower than a selected criteria as peaks stemming from a signal of interest.

14. The apparatus of claim 13, where the signal analyzer is configured to measure peak widths by taking an average difference between a highest point and its neighboring points on each side.

15. The apparatus of claim 10, where the signal analyzer is configured to:

determine a stability of peaks by comparing peaks in a current spectra of the frequency-based digital data to peaks from a previous spectra of the frequency-based digital data; and identify stable peaks as peaks not stemming from wind noise.

16. The apparatus of claim 10, where the signal analyzer is configured to:

identify peaks whose phase and amplitude differences exceed a difference threshold as peaks stemming from wind noise.

17. The apparatus of claim 10, where the signal analyzer is configured to:

fit a line to a portion of a spectrum of the frequency-based digital data;

compare a slope of the line to a pre-defined threshold; and determine whether wind noise is present in the spectrum of the frequency-based digital data based on the slope.

18. The apparatus of claim 10, where the signal analyzer is configured to:

fit a line to a portion of a spectrum of the frequency-based digital data;

compare an intersection point of the line to a pre-defined threshold; and determine whether wind noise is present in the spectrum of the frequency-based digital data based on the intersection point.

19. A computer program product, comprising:

a non-transitory computer usable storage medium having computer readable program code embodied therein configured for suppressing noise, comprising:

computer readable code configured to cause a computer to perform a time-frequency transform on the signal to obtain transformed data representing a single channel of acoustic data associated with a single microphone;

computer readable code configured to cause the computer to perform signal analysis on the transformed data to identify wind noise in the transformed data, where the computer readable code configured to cause the computer to perform the signal analysis comprises:

computer readable code configured to cause the computer to measure one or more characteristics of the transformed data indicative of wind pressure fluctuations associated with wind striking a portion of the single microphone by identifying signal segments of the signal that lack a time-varying quasi-periodic amplitude and phase; and computer readable code configured to cause the computer to discriminate between the wind noise and a signal of interest in the transformed data by comparing the harmonic structure of the signal segments of the signal to the harmonic structure of other signal segments of the signal that have a time varying periodic amplitude and a phase modulated sinusoid characteristic; and computer readable code configured to cause the computer to attenuate at least a portion of the wind noise identified in the transformed data at frequencies dominated by wind noise;

where the discriminating between the wind noise and the signal of interest occurs on the output of the single microphone that sources the single channel of the acoustic data.

20. The computer program product of claim 19, where the computer readable code configured to cause the computer to perform signal analysis further comprises:

computer readable code configured to cause the computer to fit a line to a portion of a spectrum of the transformed data;

computer readable code configured to cause the computer to compare a slope of the line and an intersection point of the line to a plurality of pre-defined thresholds; and computer readable code configured to cause the computer to determine whether wind noise is present in the spectrum of the transformed data based on the slope and the intersection point.

* * * * *